United States Patent
Huang et al.

(10) Patent No.: US 10,045,289 B2
(45) Date of Patent: Aug. 7, 2018

(54) METHOD AND APPARATUS FOR CONTROLLING ENABLING OF STATION

(71) Applicant: Huawei Technologies Co., Ltd., Shenzhen, Guangdong (CN)

(72) Inventors: Fan Huang, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/464,792

(22) Filed: Mar. 21, 2017

(65) Prior Publication Data
US 2017/0195952 A1 Jul. 6, 2017

Related U.S. Application Data (63) Continuation of application No. PCT/CN2014/087049, filed on Sep. 22, 2014.

(51) Int. Cl.
*H04W 52/02* (2009.01)
*H04W 16/32* (2009.01)

(52) U.S. Cl.
CPC ....... *H04W 52/0206* (2013.01); *H04W 16/32* (2013.01)

(58) Field of Classification Search
CPC . H04W 52/0206; H04W 52/04; H04W 24/02; H04W 28/08; H04W 16/32;
(Continued)

(56) References Cited

U.S. PATENT DOCUMENTS

2012/0004009 A1* 1/2012 Lindoff ............ H04W 52/0232
455/522
2013/0005385 A1* 1/2013 Hunukumbure ...... H04W 16/22
455/517
(Continued)

FOREIGN PATENT DOCUMENTS

CN 101977403 A 2/2011
CN 102186209 A 9/2011
(Continued)

OTHER PUBLICATIONS

TeliaSonera; "Network Sharing in Inter-RAT energy saving"; 3GPP TSG RAN WG3 Meeting #71; R3-110847; Taipei, Taiwan; Feb. 21-25, 2011; 4 pages.
(Continued)

*Primary Examiner* — Liton Miah (57) ABSTRACT

A method for controlling enabling of a station, the method compromising: determining, according to coverage of at least two stations and expected transmission rates of all services, at least one target service that meets a first preset condition or a second preset condition, the first preset condition comprises: for a first target service corresponding to a first station, only the first station can meet an expected transmission rate of the first target service, and the second preset condition comprises: for a second target service corresponding to a second station, no station can meet an expected transmission rate of the second target service; and determining a target station as a to-be-enabled station from the at least two stations according to a sum of expected transmission rates of target services corresponding to each station.

16 Claims, 3 Drawing Sheets

(58) Field of Classification Search
CPC . H04W 84/045; H04W 92/10; H04W 52/244;
H04W 52/40
See application file for complete search history.

(56) References Cited

U.S. PATENT DOCUMENTS

| | | | |
|---|---|---|---|
| 2013/0122913 A1* | 5/2013 | Agarwal | H04W 24/02 455/439 |
| 2013/0137446 A1* | 5/2013 | Narlikar | H04W 16/08 455/452.1 |
| 2013/0143542 A1* | 6/2013 | Kovvali | H04W 48/18 455/418 |
| 2013/0235778 A1 | 9/2013 | Maeder et al. | |
| 2013/0272187 A1* | 10/2013 | Malladi | H04L 5/001 370/315 |
| 2013/0310048 A1 | 11/2013 | Hunukumbure et al. | |

FOREIGN PATENT DOCUMENTS

| | | | |
|---|---|---|---|
| CN | 102802247 A | 11/2012 | |
| CN | 103391604 A | 11/2013 | |
| CN | 103596253 A | 2/2014 | |
| CN | 104010356 A | 8/2014 | |

OTHER PUBLICATIONS

NEC Corporation; "Energy Saving Enhancement Based on User QoS Requirement"; 3GPP TSG-RAN WG3 #79bis; R3-130626; Chicago, Illinois, United States; Apr. 15-19, 2013; 6 pages.

* cited by examiner

METHOD AND APPARATUS FOR CONTROLLING ENABLING OF STATION

CROSS-REFERENCE TO RELATED APPLICATIONS

This application is a continuation of International Patent Application No. PCT/CN2014/087049, filed on Sep. 22, 2014, the disclosure of which is hereby incorporated by reference in its entirety.

TECHNICAL FIELD

The present invention relates to the communications field, and more specifically, to a method and an apparatus for controlling enabling of a station.

BACKGROUND

In a highly dense macro-micro hybrid network (Dense HetNet), a macro base station is responsible for wide-range coverage, and a small cell is mainly responsible for meeting a data service transmission requirement in a local area.

Because service distribution changes relatively fast within a small range, enough small cells usually need to be disposed in a network deployment phase. As hardware costs of the small cell decrease, it may be even considered to deploy a small cell in any place in which a small cell can be deployed.

However, because service distribution dynamically changes, if all stations (including the macro base station and the small cell) are kept in an enabled state at any time, some stations may have few services to process within a period of time, or even have no service to process, which causes a serious energy waste, thereby causing an energy consumption increase of a communications system.

SUMMARY

Embodiments of the present invention provide a method and an apparatus for controlling enabling of a station, so as to reduce energy consumption of a communications system.

According to a first aspect, an apparatus for controlling enabling of a station is provided, where the apparatus is disposed in a communications system that includes at least two stations, and the apparatus includes: a coverage determining unit, configured to determine coverage of the at least two stations; an expected transmission rate determining unit, configured to determine expected transmission rates of all services accessed by using the communications system; a target service determining unit, configured to determine, from all the services according to the coverage of the at least two stations and the expected transmission rates of all the services, at least one target service that meets a preset condition, where one target service is corresponding to merely one station of the at least two stations, and the preset condition includes a first preset condition or a second preset condition, the first preset condition is: for a first target service corresponding to a first station, in the at least two stations, only the first station can meet an expected transmission rate of the first target service, and user equipment that accesses the first target service is located within coverage of the first station, and the second preset condition is: for a second target service corresponding to a second station, in the at least two stations, no station can meet an expected transmission rate of the second target service, and user equipment that accesses the second target service is located within coverage of the second station; and a to-be-enabled station determining unit, configured to determine a target station as a to-be-enabled station from the at least two stations according to a sum of expected transmission rates of all target services corresponding to each station.

With reference to the first aspect, in a first implementation manner of the first aspect, the target service determining unit is specifically configured to determine a target station as a to-be-enabled station from the at least two stations according to a first preset threshold and the sum of the expected transmission rates of all the target services corresponding to each station, where a sum of expected transmission rates of all target services corresponding to the target station is greater than or equal to the first preset threshold.

With reference to the first aspect and the foregoing implementation manner, in a second implementation manner of the first aspect, the target service determining unit is specifically configured to determine a target station as a to-be-enabled station from the at least two stations according to the sum of the expected transmission rates of all the target services corresponding to each station and according to a transmission rate that each station can provide, where a transmission rate that the target station can provide is greater than or equal to a second preset threshold.

With reference to the first aspect and the foregoing implementation manners, in a third implementation manner of the first aspect, the second preset condition is specifically: for the second target service corresponding to the second station, in the at least two stations, no station can meet the expected transmission rate of the second target service, and user equipment that accesses the second target service is located within coverage of at least two overlapping stations including the second station, where the second station is a station that can provide a highest transmission rate in the at least two overlapping stations.

With reference to the first aspect and the foregoing implementation manners, in a fourth implementation manner of the first aspect, the to-be-enabled station determining unit is further configured to determine a to-be-processed service, where the to-be-processed service is a service, in all the services, other than all the target services corresponding to the target station; configured to determine a candidate station, where the candidate station is a station, in the at least two stations, other than the target station; configured to determine, according to coverage of each candidate station, a to-be-processed service corresponding to each candidate station, where user equipment of a to-be-processed service corresponding to one candidate station is located within coverage of the candidate station; and configured to control enabling of each candidate station according to a sum of expected transmission rates of all to-be-processed services corresponding to the candidate station.

With reference to the first aspect and the foregoing implementation manners, in a fifth implementation manner of the first aspect, the to-be-enabled station determining unit is specifically configured to determine a first candidate station according to the sum of the expected transmission rates of all the to-be-processed services corresponding to each candidate station, where the first candidate station is a station, in the candidate stations, corresponding to to-be-processed services with a sum of expected transmission rates being maximum; configured to determine a first remaining service, where the first remaining service is a service, in the to-be-processed services, other than the to-be-processed services corresponding to the first candidate station; configured to determine, according to the coverage of each candidate station, a first remaining service corresponding to each candidate station, where user equipment of a first remaining service corresponding to one candidate station is located within coverage of the candidate station; configured to determine a second candidate station according to a sum of expected transmission rates of first remaining services corresponding to each candidate station, where the second candidate station is a station, in the candidate stations, corresponding to first remaining services with a sum of expected transmission rates being maximum; configured to determine a third candidate station according to the sum of the expected transmission rates of all the to-be-processed services corresponding to each candidate station, where the third candidate station is a station, in stations whose coverage overlaps with that of the first candidate station, corresponding to to-be-processed services with a sum of expected transmission rates being maximum; configured to determine a second remaining service, where the second remaining service is a service, in the to-be-processed services, other than the to-be-processed services corresponding to the third candidate station; configured to determine a fourth candidate station according to a sum of expected transmission rates of all second remaining services corresponding to each candidate station, where the fourth candidate station is a station, in the candidate stations, corresponding to second remaining services with a sum of expected transmission rates being maximum; configured to determine a first statistical rate and a second statistical rate, where the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and configured to determine the first candidate station as a to-be-enabled station if the first statistical rate is greater than the second statistical rate; or configured to determine the third candidate station as a to-be-enabled station if the first statistical rate is less than the second statistical rate.

With reference to the first aspect and the foregoing implementation manners, in a sixth implementation manner of the first aspect, the target service determining unit is specifically configured to determine, according to the coverage of the at least two stations, a non-overlapping part, in coverage of each station, that does not overlap with coverage of another station, and determine, from all the services, a first candidate service that user equipment located in the non-overlapping part accesses; and configured to determine, from the first candidate service according to an expected transmission rate of the first candidate service, a service that belongs to the target service.

With reference to the first aspect and the foregoing implementation manners, in a seventh implementation manner of the first aspect, the target service determining unit is specifically configured to determine, according to the coverage of the at least two stations, an overlapping part, in the coverage of each station, that overlaps with coverage of another station, and determine, from all the services, a second candidate service that user equipment located in the overlapping part accesses; and configured to determine, from the second candidate service according to an expected transmission rate of the second candidate service, a service that belongs to the target service.

According to a second aspect, a method for controlling enabling of a station is provided, where the method is executed in a communications system that includes at least two stations, and the method includes: determining coverage of the at least two stations; determining expected transmission rates of all services accessed by using the communications system; determining, from all the services according to the coverage of the at least two stations and the expected transmission rates of all the services, at least one target service that meets a preset condition, where one target service is corresponding to merely one station of the at least two stations, and the preset condition includes a first preset condition or a second preset condition, the first preset condition is: for a first target service corresponding to a first station, in the at least two stations, only the first station can meet an expected transmission rate of the first target service, and user equipment that accesses the first target service is located within coverage of the first station, and the second preset condition is: for a second target service corresponding to a second station, in the at least two stations, no station can meet an expected transmission rate of the second target service, and user equipment that accesses the second target service is located within coverage of the second station; and determining a target station as a to-be-enabled station from the at least two stations according to a sum of expected transmission rates of all target services corresponding to each station.

With reference to the second aspect, in a first implementation manner of the second aspect, the determining a target station as a to-be-enabled station from the at least two stations according to a sum of expected transmission rates of all target services corresponding to each station includes: determining a target station as a to-be-enabled station from the at least two stations according to a first preset threshold and the sum of the expected transmission rates of all the target services corresponding to each station, where a sum of expected transmission rates of all target services corresponding to the target station is greater than or equal to the first preset threshold.

With reference to the second aspect and the foregoing implementation manner, in a second implementation manner of the second aspect, the determining a target station as a to-be-enabled station from the at least two stations according to a sum of expected transmission rates of all target services corresponding to each station includes: determining a target station as a to-be-enabled station from the at least two stations according to the sum of the expected transmission rates of all the target services corresponding to each station and according to a transmission rate that each station can provide, where a transmission rate that the target station can provide is greater than or equal to a second preset threshold.

With reference to the second aspect and the foregoing implementation manners, in a third implementation manner of the second aspect, the second preset condition is specifically: for the second target service corresponding to the second station, in the at least two stations, no station can meet the expected transmission rate of the second target service, and user equipment that accesses the second target service is located within coverage of at least two overlapping stations including the second station, where the second station is a station that can provide a highest transmission rate in the at least two overlapping stations.

With reference to the second aspect and the foregoing implementation manners, in a fourth implementation manner of the second aspect, the method further includes: determining a to-be-processed service, where the to-be-processed service is a service, in all the services, other than all the target services corresponding to the target station; determining a candidate station, where the candidate station is a station, in the at least two stations, other than the target station; determining, according to coverage of each candidate station, a to-be-processed service corresponding to each candidate station, where user equipment of a to-be-processed service corresponding to one candidate station is located within coverage of the candidate station; and controlling enabling of each candidate station according to a sum of expected transmission rates of all to-be-processed services corresponding to the candidate station.

With reference to the second aspect and the foregoing implementation manners, in a fifth implementation manner of the second aspect, the controlling enabling of each candidate station according to a sum of expected transmission rates of all to-be-processed services corresponding to the candidate station includes: determining a first candidate station according to the sum of the expected transmission rates of all the to-be-processed services corresponding to each candidate station, where the first candidate station is a station, in the candidate stations, corresponding to to-be-processed services with a sum of expected transmission rates being maximum; determining a first remaining service, where the first remaining service is a service, in the to-be-processed services, other than the to-be-processed services corresponding to the first candidate station; determining, according to the coverage of each candidate station, a first remaining service corresponding to each candidate station, where user equipment of a first remaining service corresponding to one candidate station is located within coverage of the candidate station; determining a second candidate station according to a sum of expected transmission rates of first remaining services corresponding to each candidate station, where the second candidate station is a station, in the candidate stations, corresponding to first remaining services with a sum of expected transmission rates being maximum; determining a third candidate station according to the sum of the expected transmission rates of all the to-be-processed services corresponding to each candidate station, where the third candidate station is a station, in stations whose coverage overlaps with that of the first candidate station, corresponding to to-be-processed services with a sum of expected transmission rates being maximum; determining a second remaining service, where the second remaining service is a service, in the to-be-processed services, other than the to-be-processed services corresponding to the third candidate station; determining a fourth candidate station according to a sum of expected transmission rates of all second remaining services corresponding to each candidate station, where the fourth candidate station is a station, in the candidate stations, corresponding to second remaining services with a sum of expected transmission rates being maximum; determining a first statistical rate and a second statistical rate, where the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and determining the first candidate station as a to-be-enabled station if the first statistical rate is greater than the second statistical rate; or determining the third candidate station as a to-be-enabled station if the first statistical rate is less than the second statistical rate.

With reference to the second aspect and the foregoing implementation manners, in a sixth implementation manner of the second aspect, the determining, from all the services according to the coverage of the at least two stations and the expected transmission rates of all the services, at least one target service that meets a preset condition includes: determining, according to the coverage of the at least two stations, a non-overlapping part, in coverage of each station, that does not overlap with coverage of another station, and determining, from all the services, a first candidate service that user equipment located in the non-overlapping part accesses; and determining, from the first candidate service according to an expected transmission rate of the first candidate service, a service that belongs to the target service.

With reference to the second aspect and the foregoing implementation manners, in a seventh implementation manner of the second aspect, the determining, from all the services according to the coverage of the at least two stations and the expected transmission rates of all the services, at least one target service that meets a preset condition includes: determining, according to the coverage of the at least two stations, an overlapping part, in the coverage of each station, that overlaps with coverage of another station, and determining, from all the services, a second candidate service that user equipment located in the overlapping part accesses; and determining, from the second candidate service according to an expected transmission rate of the second candidate service, a service that belongs to the target service.

According to the method and the apparatus for controlling enabling of a station in the embodiments of the present invention, a target service corresponding to each station can be determined according to coverage of the station, an expected transmission rate of each service, and a preset condition. With a restriction of the preset condition, an expected transmission rate of one target service can be met merely in a corresponding station, or cannot be met in any station. Therefore, traffic to be processed by one unique station can be determined, and a correspondence between a service distribution change and a demanding degree of a system for each station is reflected. Further, a to-be-enabled station is determined according to a sum of expected transmission rates of all target services corresponding to each station, which can respond to the service distribution change, and make the enabled station coincide with current service distribution, thereby reducing an energy waste and reducing energy consumption of a communications system.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM, Global System for Mobile communication), a Code Division Multiple Access (CDMA, Code Division Multiple Access) system, Wideband Code Division Multiple Access (WCDMA, Wideband Code Division Multiple Access) system, a general packet radio service (GPRS, General Packet Radio Service) system, and Long Term Evolution (LTE, Long Term Evolution) system.

User equipment (UE, User Equipment), also referred to as a mobile terminal (Mobile Terminal), mobile user equipment, and the like, may communicate with one or more core networks by using a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, hand-held, computer built-in, or in-vehicle mobile apparatus, which exchanges voice and/or data with the radio access network.

A station in the embodiments of the present invention may be a macro cell radio network controller (RNC, Radio Network Controller) or a NodeB (NodeB), or may be a base transceiver station (BTS, Base Transceiver Station) or a base station controller in GSM or CDMA, or may be a NodeB (NodeB) or a base station controller in WCDMA, or may be an evolved NodeB (eNB or e-NodeB, evolved Node B) in LTE, which is not limited in the present invention.

Alternatively, a station in the embodiments of the present invention may be a micro cell base station, may be a micro (Micro) base station, may be a Pico (Pico) base station, or may be a home eNodeB, which may also be referred to as a femto (femto) cell or an access point (AP, Access Point), which is not limited in the present invention.

In the embodiments of the present invention, an execution body of a method for controlling enabling of a station, or an apparatus for controlling enabling of a station may be a controller that can exchange signaling with each station, where the controller can send an enabling instruction or a disabling instruction to each station, so as to control enabling of each station. In addition, the foregoing signaling can be transmitted by using a wireless communications technology, that is, the foregoing controller is in a wireless communication connection with each station. Alternatively, the foregoing signaling can be transmitted by using a physical communication medium, such as a cable or an optical cable. The present invention sets no special limitation thereto. In addition, the controller may be independently disposed in a communications system, or may be replaced by a station (for example, a macro base station) that integrates a function of the controller, which is not specially limited in the present invention.

Figure 1:
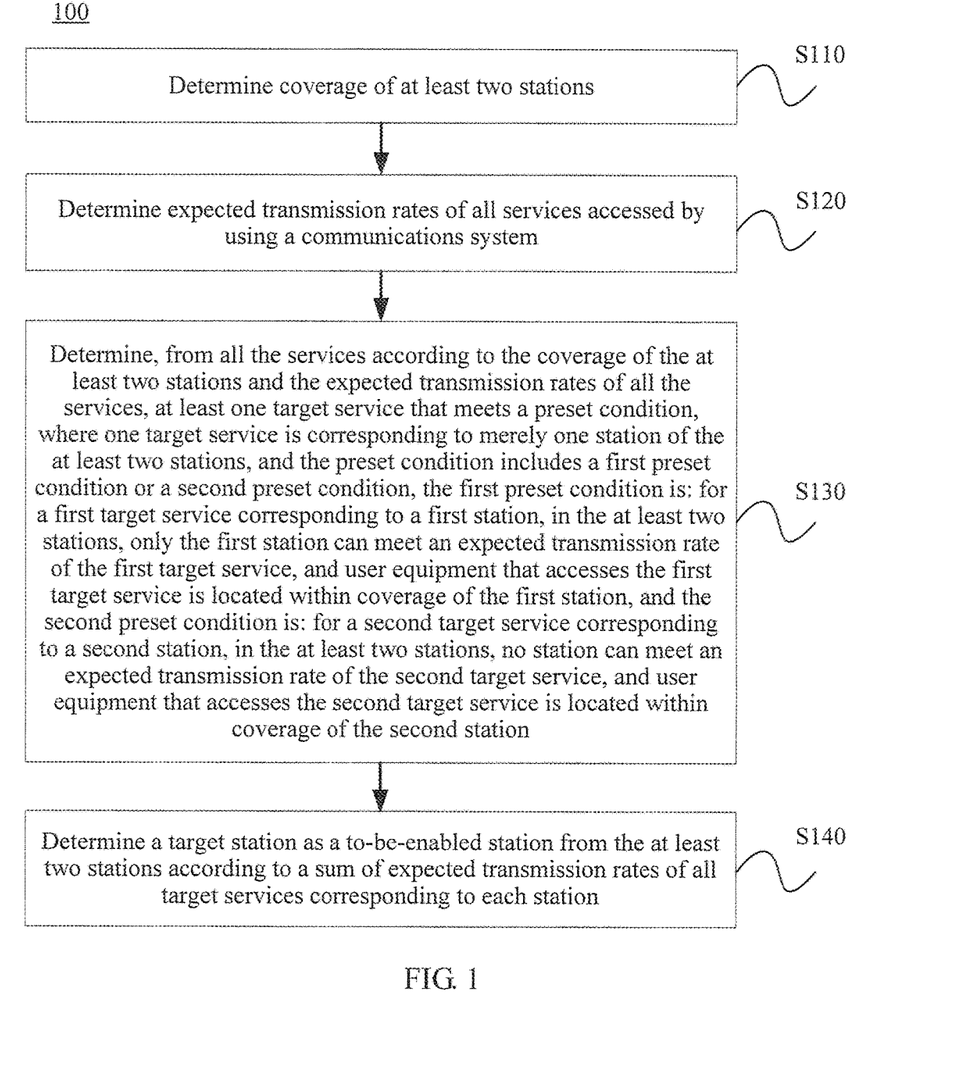
FIG. 1 is a schematic flowchart of a method for controlling enabling of a station according to an embodiment of the present invention.

FIG. 1 is a schematic flowchart of a method 100 for controlling enabling of a station according to an embodiment of the present invention. The method 100 is executed in a communications system that includes at least two stations. As shown in FIG. 1, the method 100 includes:

S110. Determine coverage of the at least two stations.

S120. Determine expected transmission rates of all services accessed by using the communications system.

S130. Determine, from all the services according to the coverage of the at least two stations and the expected transmission rates of all the services, at least one target service that meets a preset condition, where one target service is corresponding to merely one station of the at least two stations, and the preset condition includes a first preset condition or a second preset condition, where the first preset condition is: for a first target service corresponding to a first station, in the at least two stations, only the first station can meet an expected transmission rate of the target service, and user equipment that accesses the first target service is located within coverage of the first station; and the second preset condition is: for a second target service corresponding to a second station, in the at least two stations, no station can meet an expected transmission rate of the target service, and user equipment that accesses the second target service is located within coverage of the second station.

S140. Determine a target station as a to-be-enabled station from the at least two stations according to a sum of expected transmission rates of all target services corresponding to each station.

Specifically, in S110, a controller can determine coverage of each station. It should be noted that, in this embodiment of the present invention, coverage of a station is merely coverage within which the station can perform data transmission. That is, user equipment located within coverage of a station A not only can detect a pilot signal of the station A, but also can perform data transmission with the station A.

In this embodiment of the present invention, the controller may determine coverage of a carrier according to antenna configuration information of each station, for example, an oblique angle, of a beam direction of the carrier transmitted by an antenna, in a vertical direction; and further determine the coverage of the carrier as coverage of the station. Coverage of each station may also be determined by using the foregoing antenna configuration information with reference to an interference condition between adjacent stations. For example, a current location of user equipment may be determined, and a signal to interference plus noise ratio in a signal received by the user equipment from a station A is obtained. If the signal to interference plus noise ratio is close to a preset threshold, it may be considered that the user equipment is located on a border of coverage of the station A. Therefore, it can be determined that an area between the location and the station A belongs to the coverage of the station A.

It should be understood that the above-enumerated methods for determining coverage of a station are only exemplary description, which is not specially limited in the present invention. In addition, the foregoing specific process may also be similar to that of the prior art, and to avoid repetition, detailed description of the process is omitted herein.

In S120, the controller can determine the expected transmission rates of all the services that currently exist in the system. In this embodiment of the present invention, an expected transmission rate of a service may be determined according to a lowest transmission rate that is needed to maintain implementation of the service, for example, the lowest transmission rate that is needed to maintain implementation of the service may be determined as the expected transmission rate of the service.

In addition, exemplary but not restrictive, in this embodiment of the present invention, the controller may collect statistics on a lowest transmission rate that a service of each service type needs. Therefore, when executing the method 100, the controller determines, according to a service type, a lowest transmission rate that is needed to maintain implementation of the service. For example, it may be determined that a service of a real-time type has a higher expected rate, and it may be determined that a service of a non-real-time type has a lower expected rate. In addition, the service of the real-time type may be a service such as an online game, an online video, or a video call; the service of the non-real-time type may be a service such as web browsing or data downloading.

It should be understood that, the above-enumerated method for determining an expected transmission rate of a service is only exemplary description, and the present invention is not limited thereto. On a basis of the lowest transmission rate that the foregoing service needs, it may also be determined, according to user information such as user subscription information and a user priority, an expected transmission rate of a service that the user accesses. This process may be similar to that in the prior art, and to avoid repetition, detailed description of the process is omitted herein.

In S130, the controller can determine a target service corresponding to each station.

In this embodiment of the present invention, because coverage of stations may overlap, services currently existing in the system may be classified into two types:

Type A: User equipment of the service is only located within coverage of one station.

Type B: User equipment of the service is located within coverage in which two or more than two stations overlap.

The following respectively describes methods for determining a target service from the two types of services.

For the type A service, optionally, the determining, from all the services according to the coverage of the at least two stations and the expected transmission rates of all the services, at least one target service that meets a preset condition includes:

determining, according to the coverage of the at least two stations, a non-overlapping part, in coverage of each station, that does not overlap with coverage of another station, and determining, from all the services, a first candidate service that user equipment located in the non-overlapping part accesses; and determining, from the first candidate service according to an expected transmission rate of the first candidate service, a service that belongs to the target service.

Specifically, the controller may determine a non-overlapping coverage area in the system of each station according to the coverage of each station. That is, the non-overlapping coverage area belongs to coverage of only one station. Therefore, it may be determined that a service that user equipment located in the non-overlapping coverage area accesses belongs to the type A service.

Without loss of generality, for a type A service (denoted as type A service #1 in the following for ease of understanding), if user equipment that accesses the type A service #1 is located within coverage of a station #1, the controller can determine that the type A service #1 is corresponding to the station #1, that is, the type A service #1 belongs to a target service corresponding to the station #1.

It should be noted that, in this embodiment of the present invention, for the type A service #1, the station #1 may be a station that can meet an expected transmission rate of the type A service #1, or may be a station that cannot meet an expected transmission rate of the type A service #1, which is not specially limited in the present invention. That is, the type A service may be a service that meets the foregoing first preset condition, or may be a service that meets the foregoing second preset condition.

For the type B service, optionally, the determining, from all the services according to the coverage of the at least two stations and the expected transmission rates of all the services, at least one target service that meets a preset condition includes:

determining, according to the coverage of the at least two stations, an overlapping part, in the coverage of each station, that overlaps with coverage of another station, and determining, from all the services, a second candidate service that user equipment located in the overlapping part accesses; and determining, from the second candidate service according to an expected transmission rate of the second candidate service, a service that belongs to the target service.

Specifically, the controller may determine an overlapping coverage area in the system of each station according to the coverage of each station. That is, the overlapping coverage area belongs to coverage of at least two stations. Therefore, it may be determined that a service that user equipment located in the overlapping coverage area accesses belongs to the type B service.

Without loss of generality, for a type B service (denoted as type B service #1 in the following for ease of understanding), there may exist the following three cases:

Case 1

For example, user equipment that accesses the type B service #1 is located within coverage of a station #2 and a station #3. In addition, only the station #2 can meet an expected transmission rate of the type B service #1.

In this case, the controller can determine that the type B service #1 is corresponding to the station #2, that is, the type B service #1 belongs to a target service corresponding to the station #2. That is, the type B service #1 may be a service that meets the foregoing first preset condition.

Case 2

For example, user equipment that accesses a type B service #2 is located within coverage of a station #4 and a station #5. In addition, both the station #4 and the station #5 can meet an expected transmission rate of the type B service #2.

In this case, the controller can determine that the type B service #2 does not belong to the target service.

Case 3

For example, user equipment that accesses a type B service #3 is located within coverage of a station #4 and a station #5. In addition, neither of the station #4 and the station #5 can meet an expected transmission rate of the type B service #3.

In this case, the controller can determine that the type B service #3 belongs to a target service of the station #4 or the station #5.

Optionally, the second preset condition is specifically:

for the second target service corresponding to the second station, in the at least two stations, no station can meet the expected transmission rate of the target service, and user equipment that accesses the second target service is located within coverage of at least two overlapping stations including the second station, where the second station is a station that can provide a highest transmission rate in the at least two overlapping stations.

Specifically, in case 3, the controller can determine a transmission rate that the station #4 can provide, and a transmission rate that the station #5 can provide. For example, if the transmission rate that the station #4 can provide is greater than or equal to the transmission rate that the station #5 can provide, the station #4 is a station that can provide the higher transmission rate in the stations whose coverage covers the user equipment of the type B service #3. Therefore, the controller can determine that the type B service #3 belongs to the station #4. That is, the type B service #3 may be a service that meets the foregoing second preset condition.

In S140, after determining the target service corresponding to each station, the controller can determine, according to the sum of the expected transmission rates of all the target services corresponding to each station (or may be referred to as traffic of all the target services), a station that needs to be enabled, that is, a target station.

Optionally, the determining a target station as a to-be-enabled station from the at least two stations according to a sum of expected transmission rates of all target services corresponding to each station includes:

determining a target station as a to-be-enabled station from the at least two stations according to a first preset threshold and the sum of the expected transmission rates of all the target services corresponding to each station, where a sum of expected transmission rates of all target services corresponding to the target station is greater than or equal to the first preset threshold.

Specifically, in this embodiment of the present invention, the controller can determine the sum of the expected transmission rates of the target services corresponding to each station, and determine, as the foregoing target station, a station corresponding to target services of which a sum of expected transmission rates is greater than the first preset threshold. It should be noted that, in this embodiment of the present invention, a specific value of the first preset threshold may be obtained by means of statistics or experiments, which is not specially limited in the present invention.

Optionally, the determining a target station as a to-be-enabled station from the at least two stations according to a sum of expected transmission rates of all target services corresponding to each station includes:

determining a target station as a to-be-enabled station from the at least two stations according to the sum of the expected transmission rates of all the target services corresponding to each station and according to a transmission rate that each station can provide, where a transmission rate that the target station can provide is greater than or equal to a second preset threshold.

Specifically, in this embodiment of the present invention, the controller can determine the sum of the expected transmission rates of the target services corresponding to each station. Therefore, there may exist a case that sums of expected transmission rates of target services corresponding to multiple stations are similar (for example, a difference between the sums of the expected transmission rates of the target services corresponding to the stations is within a preset range). For ease of understanding and description, these stations are referred to as similar stations. In this case, the controller can determine transmission rates that the similar stations can provide, and determines, as a target station from the foregoing similar stations, a station (one or more) that can provide a relatively high transmission rate.

It should be noted that, in the foregoing manner of determining the target station, the foregoing similar stations may also be determined from stations corresponding to target services of which a sum of expected transmission rates is greater than the first preset threshold, which is not specially limited in the present invention.

As described above, a target station can be determined as a to-be-enabled station. Afterward, the controller may continue to determine a station that needs to be enabled from stations that are not determined as target stations.

Optionally, the method further includes:

determining a to-be-processed service, where the to-be-processed service is a service, in all the services, other than all the target services corresponding to the target station;

determining a candidate station, where the candidate station is a station, in the at least two stations, other than the target station;

determining, according to coverage of each candidate station, a to-be-processed service corresponding to each candidate station, where user equipment of a to-be-processed service corresponding to one candidate station is located within coverage of the candidate station; and controlling enabling of each candidate station according to a sum of expected transmission rates of all to-be-processed services corresponding to the candidate station.

Specifically, the controller may remove the target station from stations of the system according to the foregoing determined target station, and a remaining station is used as a candidate station that the controller subsequently needs to determine whether to enable.

The controller can determine a target service within coverage of the target station (that is, the target service corresponding to the target station) according to the coverage of the foregoing determined target station, removes target services corresponding to all target stations from all current services of the system, so as to obtain a to-be-processed service that is used as a basis for subsequently determining whether to enable the candidate station.

In addition, the controller can determine the to-be-processed service within the coverage of the target station (that is, the to-be-processed service corresponding to the target station) according to the coverage of the foregoing determined candidate station.

Figure 2:
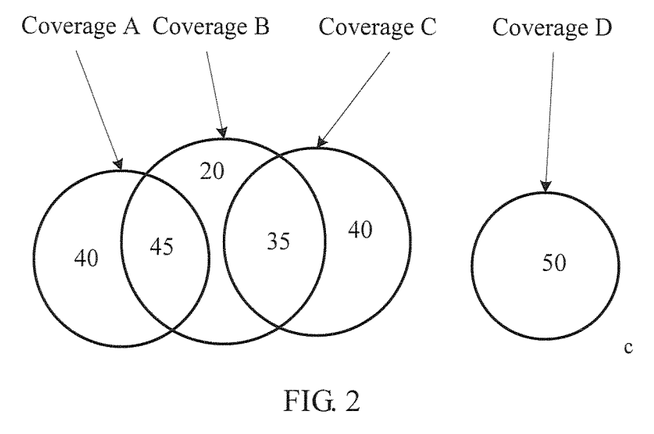
FIG. 2 is a schematic diagram that represents an example of service distribution of a communications system in which a method for controlling enabling of a station is executed according to the present invention.

FIG. 2 shows an example of service distribution of a communications system. In the example of service distribution shown in FIG. 2, a station A, a station B, a station C, and a station D are used as candidate stations, where coverage of the station A is a range A in FIG. 2, coverage of the station B is a range B in FIG. 2, coverage of the station C is a range C in FIG. 2, and coverage of the station D is a range D in FIG. 2. A number within each coverage range indicates a sum of expected transmission rates of all to-be-processed services within the coverage (or may be referred to as traffic of all the to-be-processed services).

In addition, there exists a case that the coverage of all the candidate stations overlaps. For example, FIG. 2 shows a case that the coverage of the station A overlaps with that of the station B, and a sum of expected transmission rates of to-be-processed services within the overlapping range is 45. In addition, FIG. 2 shows a case that the coverage of the station B overlaps with that of the station C, and a sum of expected transmission rates of to-be-processed services within the overlapping range is 35.

Therefore, in the example of service distribution shown in FIG. 2, a sum of expected transmission rates of to-be-processed services corresponding to the station A is 40 (a sum of expected transmission rates of to-be-processed services merely covered by the station A)+45 (a sum of expected transmission rates of to-be-processed services jointly covered by the station A and the station B)=85;

a sum of expected transmission rates of to-be-processed services corresponding to the station B is 20 (a sum of expected transmission rates of to-be-processed services merely covered by the station B)+45 (a sum of expected transmission rates of to-be-processed services jointly covered by the station A and the station B)+35 (a sum of expected transmission rates of to-be-processed services jointly covered by the station B and the station C)=100;

a sum of expected transmission rates of to-be-processed services corresponding to the station C is 40 (a sum of expected transmission rates of to-be-processed services merely covered by the station C) 35 (a sum of expected transmission rates of to-be-processed services jointly covered by the station B and the station C)=75; and a sum of expected transmission rates of to-be-processed services corresponding to the station D is 50.

It should be noted that, a form (that is, a circle) of the coverage of each candidate station shown in FIG. 2 is merely exemplary description, and the present invention is not limited thereto. In addition, in this embodiment of the present invention, a unit of a sum of expected transmission rates of to-be-processed services corresponding to each candidate station enumerated above is not shown, and may be arbitrarily determined, such as Kb/s or Mb/s.

In this embodiment of the present invention, a controller may execute the following steps to determine whether to enable each candidate station, that is:

Step A1: The controller may sort all the candidate stations according to the sum of the expected transmission rates of the to-be-processed services corresponding to each candidate station, for example, in descending order; then, the following sequence may be obtained: the station B, the station A, the station C, and the station D.

Step A2: According to the foregoing sorting, a candidate station (that is, the station B) that has a largest sum of expected transmission rates may be determined as a station that needs to be enabled.

Step A3: Recalculate a sum of expected transmission rates of to-be-processed services of a remaining candidate station. Specifically, after the station B is enabled, the to-be-processed services jointly covered by the station A and the station B and the to-be-processed services jointly covered by the station B and the station C can be accessed by using the station B. Therefore, the sum of the expected transmission rates of the to-be-processed services that the station A needs to process changes to 40, and the sum of the expected transmission rates of the to-be-processed services that the station C needs to process changes to 40. In addition, there is no to-be-processed service jointly covered by the station D and the station B, and the sum of the expected transmission rates of the to-be-processed services corresponding to the station D is still 50.

In addition, afterward, the controller may repeatedly executing step A2 and step A3 according to a system coverage requirement (for example, a quantity of stations that need to be enabled, or a ratio of a service covered by an enabled station to a service covered by a disabled station), until the system coverage requirement is met. It should be understood that a specific parameter of the above-enumerated system coverage requirement is only exemplary description, which is not specially limited in the present invention.

If only two candidate stations are selected as to-be-enabled stations according to the foregoing steps, the station B (the sum of the expected transmission rates of the corresponding to-be-processed services is 100) and the station D (the sum of the expected transmission rates of the corresponding to-be-processed services is 50) are sequentially selected. Therefore, a sum of expected transmission rates of covered to-be-processed services is 150, and a sum of expected transmission rates of remaining to-be-processed services is 80.

However, if the station A (the sum of the expected transmission rates of the corresponding to-be-processed services is 85) and the station C (the sum of the expected transmission rates of the corresponding to-be-processed services is 75) are sequentially selected, the sum of the expected transmission rates of the covered to-be-processed services can reach 160, and the sum of the expected transmission rates of the remaining to-be-processed services is only 70, which yields better effects.

In view of the foregoing cases, in this embodiment of the present invention, the following steps may further be executed so as to determine whether to enable each candidate station, that is:

Optionally, controlling enabling of each candidate station according to a sum of expected transmission rates of all to-be-processed services corresponding to the candidate station includes:

determining a first candidate station according to the sum of the expected transmission rates of all the to-be-processed services corresponding to each candidate station, where the first candidate station is a station, in the candidate stations, corresponding to to-be-processed services with a sum of expected transmission rates being maximum;

determining a first remaining service, where the first remaining service is a service, in the to-be-processed services, other than the to-be-processed services corresponding to the first candidate station;

determining, according to the coverage of each candidate station, a first remaining service corresponding to each candidate station, where user equipment of a first remaining service corresponding to one candidate station is located within coverage of the candidate station;

determining a second candidate station according to a sum of expected transmission rates of first remaining services corresponding to each candidate station, where the second candidate station is a station, in the candidate stations, corresponding to first remaining services with a sum of expected transmission rates being maximum;

determining a third candidate station according to the sum of the expected transmission rates of all the to-be-processed services corresponding to each candidate station, where the third candidate station is a station, in stations whose coverage overlaps with that of the first candidate station, corresponding to to-be-processed services with a sum of expected transmission rates being maximum;

determining a second remaining service, where the second remaining service is a service, in the to-be-processed services, other than the to-be-processed services corresponding to the third candidate station;

determining a fourth candidate station according to a sum of expected transmission rates of all second remaining services corresponding to each candidate station, where the fourth candidate station is a station, in the candidate stations, corresponding to second remaining services with a sum of expected transmission rates being maximum;

determining a first statistical rate and a second statistical rate, where the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and determining the first candidate station as a to-be-enabled station if the first statistical rate is greater than the second statistical rate; or determining the third candidate station as a to-be-enabled station if the first statistical rate is less than the second statistical rate.

Specifically, in step B1, the controller may sort all the candidate stations according to the sum of the expected transmission rates of the to-be-processed services corresponding to each candidate station, for example, in descending order; then, the following sequence may be obtained: the station B, the station A, the station C, and the station D.

In addition, a candidate station that has a largest sum of expected transmission rates may be determined according to the foregoing sorting, that is, the station B herein.

Afterward, if the station B is enabled, the to-be-processed services jointly covered by the station A and the station B and the to-be-processed services jointly covered by the station B and the station C can be accessed by using the station B. Therefore, the sum of the expected transmission rates of the to-be-processed services that the station A needs to process changes to 40, and the sum of the expected transmission rates of the to-be-processed services that the station C needs to process changes to 40. In addition, there is no to-be-processed service jointly covered by the station D and the station B, and the sum of the expected transmission rates of the to-be-processed services corresponding to the station D is still 50.

That is, if the station B is enabled, the sum of the expected transmission rates of the to-be-processed services corresponding to the station D is the largest among the remaining candidate stations.

Therefore, the station B and the station D may be determined as a combination 1.

In addition, because the candidate station that has the largest sum of the expected transmission rates is the station B, it may be determined that the station A is a station of largest coverage in stations adjacent to the station B. If the station A is enabled, the to-be-processed services jointly covered by the station A and the station B may be accessed by using the station A. Therefore, the sum of the expected transmission rates of the to-be-processed services that the station B needs to process changes to 55. In addition, because there is no to-be-processed service jointly covered by the station C, the station D, and the station A, the sum of the expected transmission rates of the to-be-processed services that the station C needs to process is still 75, and the sum of the expected transmission rates of the to-be-processed services corresponding to the station D is still 50.

That is, if the station A is enabled, the sum of the expected transmission rates of the to-be-processed services corresponding to the station C is the largest among the remaining candidate stations.

Therefore, the station A and the station C may be determined as a combination 2.

Because a sum (160) of expected transmission rates of to-be-processed services corresponding to the combination 2 is greater than a sum (150) of expected transmission rates of to-be-processed services corresponding to the combination 1, the station A may be determined as a to-be-enabled station.

Step B2: Recalculate a sum of expected transmission rates of to-be-processed services of a remaining candidate station. Specifically, after the station A is enabled, the to-be-processed services jointly covered by the station A and the station B may be accessed by using the station A. Therefore, the sum of the expected transmission rates of the to-be-processed services that the station B needs to process changes to 55.

In addition, afterward, the controller may repeatedly executing step B1 and step B2 according to a system coverage requirement (for example, a quantity of stations that need to be enabled, or a ratio of a service covered by an enabled station to a service covered by a disabled station), until the system coverage requirement is met. It should be understood that a specific parameter of the above-enumerated system coverage requirement is only exemplary description, which is not specially limited in the present invention.

According to the method for controlling enabling of a station in this embodiment of the present invention, a target service corresponding to each station can be determined according to coverage of the station, an expected transmission rate of each service, and a preset condition. With a restriction of the preset condition, an expected transmission rate of one target service can be met merely in a corresponding station, or cannot be met in any station. Therefore, traffic to be processed by one unique station can be determined, and a correspondence between a service distribution change and a demanding degree of a system for each station is reflected. Further, a to-be-enabled station is determined according to a sum of expected transmission rates of all target services corresponding to each station, which can respond to the service distribution change, and make the enabled station coincide with current service distribution, thereby reducing an energy waste and reducing energy consumption of a communications system.

The method for controlling enabling of a station according to the embodiments of the present invention is described above in detail with reference to FIG. 1 and FIG. 2. An apparatus for controlling enabling of a station according to an embodiment of the present invention is described below in detail with reference to FIG. 3.

Figure 3:
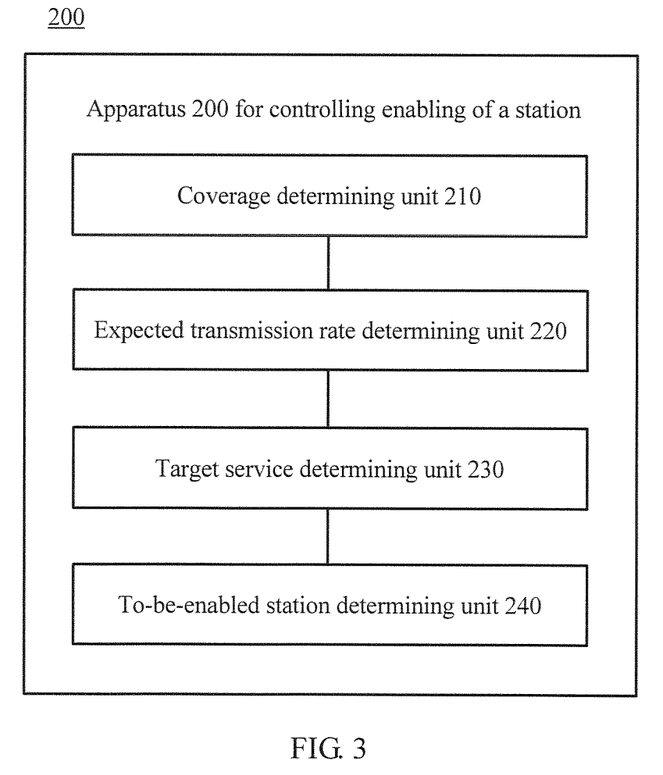
FIG. 3 is a schematic block diagram of an apparatus for controlling enabling of a station according to an embodiment of the present invention.

FIG. 3 is a structural block diagram of an apparatus 200 for controlling enabling of a station according to an embodiment of the present invention. The apparatus 200 is disposed in a communications system that includes at least two stations. As shown in FIG. 3, the apparatus 200 includes:

a coverage determining unit 210, configured to determine coverage of the at least two stations;

an expected transmission rate determining unit 220, configured to determine expected transmission rates of all services accessed by using the communications system;

a target service determining unit 230, configured to determine, from all the services according to the coverage of the at least two stations and the expected transmission rates of all the services, at least one target service that meets a preset condition, where one target service is corresponding to merely one station of the at least two stations, and the preset condition includes a first preset condition or a second preset condition, where the first preset condition is: for a first target service corresponding to a first station, in the at least two stations, only the first station can meet an expected transmission rate of the target service, and user equipment that accesses the first target service is located within coverage of the first station; and the second preset condition is: for a second target service corresponding to a second station, in the at least two stations, no station can meet an expected transmission rate of the target service, and user equipment that accesses the second target service is located within coverage of the second station; and a to-be-enabled station determining unit 240, configured to determine a target station as a to-be-enabled station from the at least two stations according to a sum of expected transmission rates of all target services corresponding to each station.

Optionally, the target service determining unit 230 is specifically configured to determine a target station as a to-be-enabled station from the at least two stations according to a first preset threshold and the sum of the expected transmission rates of all the target services corresponding to each station, where a sum of expected transmission rates of all target services corresponding to the target station is greater than or equal to the first preset threshold.

Optionally, the target service determining unit 230 is specifically configured to determine a target station as a to-be-enabled station from the at least two stations according to the sum of the expected transmission rates of all the target services corresponding to each station and according to a transmission rate that each station can provide, where a transmission rate that the target station can provide is greater than or equal to the second preset threshold.

Optionally, the second preset condition is specifically:

for the second target service corresponding to the second station, in the at least two stations, no station can meet the expected transmission rate of the target service, and user equipment that accesses the second target service is located within coverage of at least two overlapping stations including the second station, where the second station is a station that can provide a highest transmission rate in the at least two overlapping stations.

Optionally, the to-be-enabled station determining unit 240 is further configured to determine a to-be-processed service, where the to-be-processed service is a service, in all the services, other than all the target services corresponding to the target station;

configured to determine a candidate station, where the candidate station is a station, in the at least two stations, other than the target station;

configured to determine, according to coverage of each candidate station, a to-be-processed service corresponding to each candidate station, where user equipment of a to-be-processed service corresponding to one candidate station is located within coverage of the candidate station; and configured to control enabling of each candidate station according to a sum of expected transmission rates of all to-be-processed services corresponding to the candidate station.

Optionally, the to-be-enabled station determining unit 240 is specifically configured to determine a first candidate station according to the sum of the expected transmission rates of all the to-be-processed services corresponding to each candidate station, where the first candidate station is a station, in the candidate stations, corresponding to to-be-processed services with a sum of expected transmission rates being maximum;

configured to determine a first remaining service, where the first remaining service is a service, in the to-be-processed services, other than the to-be-processed services corresponding to the first candidate station;

configured to determine, according to the coverage of each candidate station, a first remaining service corresponding to each candidate station, where user equipment of a first remaining service corresponding to one candidate station is located within coverage of the candidate station;

configured to determine a second candidate station according to a sum of expected transmission rates of first remaining services corresponding to each candidate station, where the second candidate station is a station, in the candidate stations, corresponding to first remaining services with a sum of expected transmission rates being maximum;

configured to determine a third candidate station according to the sum of the expected transmission rates of all the to-be-processed services corresponding to each candidate station, where the third candidate station is a station, in stations whose coverage overlaps with that of the first candidate station, corresponding to to-be-processed services with a sum of expected transmission rates being maximum;

configured to determine a second remaining service, where the second remaining service is a service, in the to-be-processed services, other than the to-be-processed services corresponding to the third candidate station;

configured to determine a fourth candidate station according to a sum of expected transmission rates of all second remaining services corresponding to each candidate station, where the fourth candidate station is a station, in the candidate stations, corresponding to second remaining services with a sum of expected transmission rates being maximum;

configured to determine a first statistical rate and a second statistical rate, where the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and configured to determine the first candidate station as a to-be-enabled station if the first statistical rate is greater than the second statistical rate; or configured to determine the third candidate station as a to-be-enabled station if the first statistical rate is less than the second statistical rate.

Optionally, the target service determining unit 230 is specifically configured to determine, according to the coverage of the at least two stations, a non-overlapping part, in coverage of each station, that does not overlap with coverage of another station, and determine, from all the services, a first candidate service that user equipment located in the non-overlapping part accesses; and configured to determine, from the first candidate service according to an expected transmission rate of the first candidate service, a service that belongs to the target service.

Optionally, the target service determining unit 230 is specifically configured to determine, according to the coverage of the at least two stations, an overlapping part, in the coverage of each station, that overlaps with coverage of another station, and determine, from all the services, a second candidate service that user equipment located in the overlapping part accesses; and configured to determine, from the second candidate service according to an expected transmission rate of the second candidate service, a service that belongs to the target service.

The apparatus 200 for controlling enabling of a station according to this embodiment of the present invention may be corresponding to an execution body, for example, the foregoing controller, of the method 100 for controlling enabling of a station of the embodiments of the present invention. In addition, units and the foregoing other operations and/or functions in the apparatus 200 for controlling enabling of a station are respectively for implementing corresponding procedures of the method 100 in FIG. 1. For brevity, details are not described herein.

According to the apparatus for controlling enabling of a station in this embodiment of the present invention, a target service corresponding to each station can be determined according to coverage of the station, an expected transmission rate of each service, and a preset condition. With a restriction of the preset condition, an expected transmission rate of one target service can be met merely in a corresponding station, or cannot be met in any station. Therefore, traffic to be processed by one unique station can be determined, and a correspondence between a service distribution change and a demanding degree of a system for each station is reflected. Further, a to-be-enabled station is determined according to a sum of expected transmission rates of all target services corresponding to each station, which can respond to the service distribution change, and make the enabled station coincide with current service distribution, thereby reducing an energy waste and reducing energy consumption of a communications system.

The method for controlling enabling of a station according to the embodiments of the present invention is described above in detail with reference to FIG. 1 and FIG. 2. A device for controlling enabling of a station according to an embodiment of the present invention is described below in detail with reference to FIG. 4.

Figure 4:
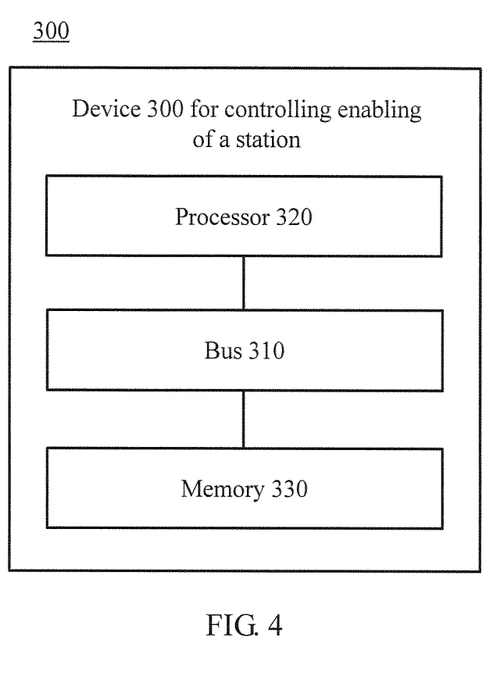
FIG. 4 is a schematic block diagram of an apparatus for controlling enabling of a station according to an embodiment of the present invention.

FIG. 4 shows a device 300 for controlling enabling of a station according to an embodiment of the present invention, where the device 300 is disposed in a communications system that includes at least two stations. As shown in FIG. 4, the device 300 includes:

a bus 310;
a processor 320 connected to the bus 310;
a memory 330 connected to the bus 310; and
a transceiver 340 connected to the bus 310, where
the processor 320 invokes, by using the bus 310, a program stored in the memory 330, so as to: determine coverage of the at least two stations;

determine expected transmission rates of all services accessed by using the communications system;

determine, from all the services according to the coverage of the at least two stations and the expected transmission rates of all the services, at least one target service that meets a preset condition, where one target service is corresponding to merely one station of the at least two stations, and the preset condition includes a first preset condition or a second preset condition, where the first preset condition is: for a first target service corresponding to a first station, in the at least two stations, only the first station can meet an expected transmission rate of the target service, and user equipment that accesses the first target service is located within coverage of the first station; and the second preset condition is: for a second target service corresponding to a second station, in the at least two stations, no station can meet an expected transmission rate of the target service, and user equipment that accesses the second target service is located within coverage of the second station; and determine a target station as a to-be-enabled station from the at least two stations according to a sum of expected transmission rates of all target services corresponding to each station.

Optionally, the processor 320 is specifically configured to determine a target station as a to-be-enabled station from the at least two stations according to a first preset threshold and the sum of the expected transmission rates of all the target services corresponding to each station, where a sum of expected transmission rates of all target services corresponding to the target station is greater than or equal to the first preset threshold.

Optionally, the processor 320 is specifically configured to determine a target station as a to-be-enabled station from the at least two stations according to the sum of the expected transmission rates of all the target services corresponding to each station and according to a transmission rate that each station can provide, where a transmission rate that the target station can provide is greater than or equal to the second preset threshold.

Optionally, the second preset condition is specifically:

for the second target service corresponding to the second station, in the at least two stations, no station can meet the expected transmission rate of the target service, and user equipment that accesses the second target service is located within coverage of at least two overlapping stations including the second station, where the second station is a station that can provide a highest transmission rate in the at least two overlapping stations.

Optionally, the processor 320 is further configured to determine a to-be-processed service, where the to-be-processed service is a service, in all the services, other than all the target services corresponding to the target station;

configured to determine a candidate station, where the candidate station is a station, in the at least two stations, other than the target station;

configured to determine, according to coverage of each candidate station, a to-be-processed service corresponding to each candidate station, where user equipment of a to-be-processed service corresponding to one candidate station is located within coverage of the candidate station; and configured to control enabling of each candidate station according to a sum of expected transmission rates of all to-be-processed services corresponding to the candidate station.

Optionally, the processor 320 is specifically configured to determine a first candidate station according to the sum of the expected transmission rates of all the to-be-processed services corresponding to each candidate station, where the first candidate station is a station, in the candidate stations, corresponding to to-be-processed services with a sum of expected transmission rates being maximum;

configured to determine a first remaining service, where the first remaining service is a service, in the to-be-processed services, other than the to-be-processed services corresponding to the first candidate station;

configured to determine, according to the coverage of each candidate station, a first remaining service corresponding to each candidate station, where user equipment of a first remaining service corresponding to one candidate station is located within coverage of the candidate station;

configured to determine a second candidate station according to a sum of expected transmission rates of first remaining services corresponding to each candidate station, where the second candidate station is a station, in the candidate stations, corresponding to first remaining services with a sum of expected transmission rates being maximum;

configured to determine a third candidate station according to the sum of the expected transmission rates of all the to-be-processed services corresponding to each candidate station, where the third candidate station is a station, in stations whose coverage overlaps with that of the first candidate station, corresponding to to-be-processed services with a sum of expected transmission rates being maximum;

configured to determine a second remaining service, where the second remaining service is a service, in the to-be-processed services, other than the to-be-processed services corresponding to the third candidate station;

configured to determine a fourth candidate station according to a sum of expected transmission rates of all second remaining services corresponding to each candidate station, where the fourth candidate station is a station, in the candidate stations, corresponding to second remaining services with a sum of expected transmission rates being maximum;

configured to determine a first statistical rate and a second statistical rate, where the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and configured to determine the first candidate station as a to-be-enabled station if the first statistical rate is greater than the second statistical rate; or configured to determine the third candidate station as a to-be-enabled station if the first statistical rate is less than the second statistical rate.

Optionally, the processor 320 is specifically configured to determine, according to the coverage of the at least two stations, a non-overlapping part, in coverage of each station, that does not overlap with coverage of another station, and determine, from all the services, a first candidate service that user equipment located in the non-overlapping part accesses; and configured to determine, from the first candidate service according to an expected transmission rate of the first candidate service, a service that belongs to the target service.

Optionally, the processor 320 is specifically configured to determine, according to the coverage of the at least two stations, an overlapping part, in the coverage of each station, that overlaps with coverage of another station, and determine, from all the services, a second candidate service that user equipment located in the overlapping part accesses; and configured to determine, from the second candidate service according to an expected transmission rate of the second candidate service, a service that belongs to the target service.

In this embodiment of the present invention, the processor may further be referred to as a CPU. The memory may include a read-only memory and a random access memory, and provides an instruction and data to the processor. A part of the memory may further include a non-volatile random access memory (NVRAM). In specific application, a data transmission device may be built into or may be a standard Ethernet communications device such as a personal computer, and modules of the data transmission device are coupled together by using a bus system. In addition to a data bus, the bus system includes a power bus, a control bus, and a status signal bus.

The processor may implement or execute steps and logical block diagrams disclosed in the method embodiments of the present invention. A general purpose processor may be a microprocessor or the processor may be any conventional processor, decoder, and the like. Steps of the methods disclosed with reference to the embodiments of the present invention may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing methods in combination with hardware of the decoding unit or processing unit.

It should be understood that in the embodiments of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor and the like.

In an implementation process, steps in the foregoing methods may be completed by using an integrated logic circuit of hardware in the processor or instructions in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein.

The device 300 for controlling enabling of a station according to this embodiment of the present invention may be corresponding to the controller in the method in the embodiments of the present invention. In addition, units, that is, modules, and the foregoing other operations and/or functions in the device 300 for controlling enabling of a station are respectively for implementing corresponding procedures of the method 100 in FIG. 1. For brevity, details are not described herein.

According to the device for controlling enabling of a station in this embodiment of the present invention, a target service corresponding to each station can be determined according to coverage of the station, an expected transmission rate of each service, and a preset condition. With a restriction of the preset condition, an expected transmission rate of one target service can be met merely in a corresponding station, or cannot be met in any station. Therefore, traffic to be processed by one unique station can be determined, and a correspondence between a service distribution change and a demanding degree of a system for each station is reflected. Further, a to-be-enabled station is determined according to a sum of expected transmission rates of all target services corresponding to each station, which can respond to the service distribution change, and make the enabled station coincide with current service distribution, thereby reducing an energy waste and reducing energy consumption of a communications system.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus for controlling enabling of a station, wherein the apparatus is disposed in a communications system that comprises at least two stations, the apparatus comprising:
   a coverage determining unit, configured to determine coverage of the at least two stations;
   an expected transmission rate determining unit, configured to determine expected transmission rates of all services accessed by using the communications system;
   a target service determining unit, configured to determine, from all the services according to the coverage of the at least two stations and the expected transmission rates of all the services, a target service that meets a preset condition, wherein the target service corresponds to only one station of the at least two stations, and the preset condition comprises a first preset condition or a second preset condition, wherein
   the first preset condition comprises:
      for a first target service corresponding to a first station of the at least two stations, only the first station can meet an expected transmission rate of the first target service, and user equipment that accesses the first target service is located within coverage of the first station; and
   the second preset condition comprises:
      for a second target service corresponding to a second station of the at least two stations, no station can meet an expected transmission rate of the second target service, and user equipment that accesses the second target service is located within coverage of the second station; and
   a to-be-enabled station determining unit, configured to determine a target station as a to-be-enabled station from the at least two stations according to a sum of expected transmission rates of all target services corresponding to each station.

2. The apparatus according to claim 1, wherein the target service determining unit is configured to determine a target station as a to-be-enabled station from the at least two stations according to a first preset threshold and the sum of the expected transmission rates of all the target services corresponding to each station, wherein a sum of expected transmission rates of all target services corresponding to the target station is greater than or equal to the first preset threshold.

3. The apparatus according to claim 1, wherein the target service determining unit is configured to determine a target station as a to-be-enabled station from the at least two stations according to the sum of the expected transmission rates of all the target services corresponding to each station and according to a transmission rate that each station can provide, wherein a transmission rate that the target station can provide is greater than or equal to a second preset threshold.

4. The apparatus according to claim 1, wherein the second preset condition comprises:
for the second target service corresponding to the second station of the at least two stations, no station can meet the expected transmission rate of the second target service, and user equipment that accesses the second target service is located within coverage of at least two overlapping stations comprising the second station, wherein the second station is a station that can provide a highest transmission rate in the at least two overlapping stations.

5. The apparatus according to claim 1, wherein the to-be-enabled station determining unit is further configured to:
determine a to-be-processed service, wherein the to-be-processed service is a service, in all the services, other than all the target services corresponding to the target station;
determine a candidate station, wherein the candidate station is a station, in the at least two stations, other than the target station;
determine, according to coverage of each candidate station, a to-be-processed service corresponding to each candidate station, wherein user equipment of a to-be-processed service corresponding to one candidate station is located within coverage of the candidate station; and
control enabling of each candidate station according to a sum of expected transmission rates of all to-be-processed services corresponding to the candidate station.

6. The apparatus according to claim 5, wherein the to-be-enabled station determining unit is configured to:
determine a first candidate station according to the sum of the expected transmission rates of all the to-be-processed services corresponding to each candidate station, wherein the first candidate station is a station, in the candidate stations, corresponding to to-be-processed services with a sum of expected transmission rates being maximum;
determine a first remaining service, wherein the first remaining service is a service, in the to-be-processed services, other than the to-be-processed services corresponding to the first candidate station;
determine, according to the coverage of each candidate station, a first remaining service corresponding to each candidate station, wherein user equipment of a first remaining service corresponding to one candidate station is located within coverage of the candidate station;
determine a second candidate station according to a sum of expected transmission rates of first remaining services corresponding to each candidate station, wherein the second candidate station is a station, in the candidate stations, corresponding to first remaining services with a sum of expected transmission rates being maximum;
determine a third candidate station according to the sum of the expected transmission rates of all the to-be-processed services corresponding to each candidate station, wherein the third candidate station is a station, in stations whose coverage overlaps with that of the first candidate station, corresponding to to-be-processed services with a sum of expected transmission rates being maximum;
determine a second remaining service, wherein the second remaining service is a service, in the to-be-processed services, other than the to-be-processed services corresponding to the third candidate station;
determine a fourth candidate station according to a sum of expected transmission rates of all second remaining services corresponding to each candidate station, wherein the fourth candidate station is a station, in the candidate stations, corresponding to second remaining services with a sum of expected transmission rates being maximum;
determine a first statistical rate and a second statistical rate, wherein the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and
determine the first candidate station as a to-be-enabled station if the first statistical rate is greater than the second statistical rate; or
determine the third candidate station as a to-be-enabled station if the first statistical rate is less than the second statistical rate.

7. The apparatus according to claim 1, wherein the target service determining unit is configured to:
determine, according to the coverage of the at least two stations, a non-overlapping part, in coverage of each station, that does not overlap with coverage of another station, and determine, from all the services, a first candidate service that user equipment located in the non-overlapping part accesses; and
determine, from the first candidate service according to an expected transmission rate of the first candidate service, a service that belongs to the target service.

8. The apparatus according to claim 1, wherein the target service determining unit is configured to:
determine, according to the coverage of the at least two stations, an overlapping part, in the coverage of each station, that overlaps with coverage of another station, and determine, from all the services, a second candidate service that user equipment located in the overlapping part accesses; and
determine, from the second candidate service according to an expected transmission rate of the second candidate service, a service that belongs to the target service.

9. A method for controlling enabling of a station, wherein the method is executed in a communications system that comprises at least two stations, the method comprising:

determining coverage of the at least two stations;

determining expected transmission rates of all services accessed by using the communications system;

determining, from all the services according to the coverage of the at least two stations and the expected transmission rates of all the services, a target service that meets a preset condition, wherein the target service corresponds to only one station of the at least two stations, and the preset condition comprises a first preset condition or a second preset condition, wherein the first preset condition comprises:

for a first target service corresponding to a first station of the at least two stations, only the first station can meet an expected transmission rate of the first target service, and user equipment that accesses the first target service is located within coverage of the first station; and the second preset condition comprises:

for a second target service corresponding to a second station of the at least two stations, no station can meet an expected transmission rate of the second target service, and user equipment that accesses the second target service is located within coverage of the second station; and determining a target station as a to-be-enabled station from the at least two stations according to a sum of expected transmission rates of all target services corresponding to each station.

10. The method according to claim 9, wherein determining a target station as a to-be-enabled station from the at least two stations according to a sum of expected transmission rates of all target services corresponding to each station comprises:

determining a target station as a to-be-enabled station from the at least two stations according to a first preset threshold and the sum of the expected transmission rates of all the target services corresponding to each station, wherein a sum of expected transmission rates of all target services corresponding to the target station is greater than or equal to the first preset threshold.

11. The method according to claim 9, wherein determining a target station as a to-be-enabled station from the at least two stations according to a sum of expected transmission rates of all target services corresponding to each station comprises:

determining a target station as a to-be-enabled station from the at least two stations according to the sum of the expected transmission rates of all the target services corresponding to each station and according to a transmission rate that each station can provide, wherein a transmission rate that the target station can provide is greater than or equal to a second preset threshold.

12. The method according to claim 9, wherein the second preset condition comprises:

for the second target service corresponding to the second station of the at least two stations, no station can meet the expected transmission rate of the second target service, and user equipment that accesses the second target service is located within coverage of at least two overlapping stations comprising the second station, wherein the second station is a station that can provide a highest transmission rate in the at least two overlapping stations.

13. The method according to claim 9, further comprising:

determining a to-be-processed service, wherein the to-be-processed service is a service, in all the services, other than all the target services corresponding to the target station;

determining a candidate station, wherein the candidate station is a station, in the at least two stations, other than the target station;

determining, according to coverage of each candidate station, a to-be-processed service corresponding to each candidate station, wherein user equipment of a to-be-processed service corresponding to one candidate station is located within coverage of the candidate station; and controlling enabling of each candidate station according to a sum of expected transmission rates of all to-be-processed services corresponding to the candidate station.

14. The method according to claim 13, wherein controlling enabling of each candidate station according to a sum of expected transmission rates of all to-be-processed services corresponding to the candidate station comprises:

determining a first candidate station according to the sum of the expected transmission rates of all the to-be-processed services corresponding to each candidate station, wherein the first candidate station is a station, in the candidate stations, corresponding to to-be-processed services with a sum of expected transmission rates being maximum;

determining a first remaining service, wherein the first remaining service is a service, in the to-be-processed services, other than the to-be-processed services corresponding to the first candidate station;

determining, according to the coverage of each candidate station, a first remaining service corresponding to each candidate station, wherein user equipment of a first remaining service corresponding to one candidate station is located within coverage of the candidate station;

determining a second candidate station according to a sum of expected transmission rates of first remaining services corresponding to each candidate station, wherein the second candidate station is a station, in the candidate stations, corresponding to first remaining services with a sum of expected transmission rates being maximum;

determining a third candidate station according to the sum of the expected transmission rates of all the to-be-processed services corresponding to each candidate station, wherein the third candidate station is a station, in stations whose coverage overlaps with that of the first candidate station, corresponding to to-be-processed services with a sum of expected transmission rates being maximum;

determining a second remaining service, wherein the second remaining service is a service, in the to-be-processed services, other than the to-be-processed services corresponding to the third candidate station;

determining a fourth candidate station according to a sum of expected transmission rates of all second remaining services corresponding to each candidate station, wherein the fourth candidate station is a station, in the candidate stations, corresponding to second remaining services with a sum of expected transmission rates being maximum;

determining a first statistical rate and a second statistical rate, wherein the first statistical rate is a total sum of the sum of the expected transmission rates of all the to-be-processed services corresponding to the first candidate station and the sum of the expected transmission rates of all the first remaining services corresponding to the second candidate station, and the second statistical rate is a total sum of the sum of the expected transmission rates of all the to-be-processed services corresponding to the third candidate station and the sum of the expected transmission rates of all the second remaining services corresponding to the fourth candidate station; and determining the first candidate station as a to-be-enabled station if the first statistical rate is greater than the second statistical rate; or determining the third candidate station as a to-be-enabled station if the first statistical rate is less than the second statistical rate.

15. The method according to claim 9, wherein determining, from all the services according to the coverage of the at least two stations and the expected transmission rates of all the services, a target service that meets a preset condition comprises:

determining, according to the coverage of the at least two stations, a non-overlapping part, in coverage of each station, that does not overlap with coverage of another station, and determining, from all the services, a first candidate service that user equipment located in the non-overlapping part accesses; and determining, from the first candidate service according to an expected transmission rate of the first candidate service, a service that belongs to the target service.

16. The method according to claim 9, wherein determining, from all the services according to the coverage of the at least two stations and the expected transmission rates of all the services, a target service that meets a preset condition comprises:

determining, according to the coverage of the at least two stations, an overlapping part, in the coverage of each station, that overlaps with coverage of another station, and determining, from all the services, a second candidate service that user equipment located in the overlapping part accesses; and determining, from the second candidate service according to an expected transmission rate of the second candidate service, a service that belongs to the target service.

* * * * *